United States Patent
Miyazaki et al.

(10) Patent No.: US 7,466,487 B2
(45) Date of Patent: Dec. 16, 2008

(54) LIGHT DIFFRACTION METHOD AND DIFFRACTION DEVICE, DIFFRACTION GRATING USED FOR THEM, AND POSITION ENCODER DEVICE

(75) Inventors: Hideki Miyazaki, Ibaraki (JP); Hiroshi Miyazaki, Miyagi (JP); Kenjiro Miyano, Tokyo (JP)

(73) Assignees: Japan Science and Technology Agency, Saimata (JP); National Institute for Materials Science, Ibaraki (JP)

( * ) Notice: Subject to any disclaimer, the term of this patent is extended or adjusted under 35 U.S.C. 154(b) by 258 days.

(21) Appl. No.: 10/561,489

(22) PCT Filed: Jul. 1, 2004

(86) PCT No.: PCT/JP2004/009342

§ 371 (c)(1),
(2), (4) Date: Mar. 15, 2006

(87) PCT Pub. No.: WO2005/003823

PCT Pub. Date: Jan. 13, 2005

(65) Prior Publication Data
US 2006/0152808 A1 Jul. 13, 2006

(30) Foreign Application Priority Data
Jul. 1, 2003 (JP) .............................. 2003-270002

(51) Int. Cl.
*G02B 5/18* (2006.01)

(52) U.S. Cl. .................. 359/576; 359/571; 359/566

(58) Field of Classification Search ................ 359/571, 359/576
See application file for complete search history.

(56) References Cited

U.S. PATENT DOCUMENTS

2003/0031846 A1    2/2003    Kumazawa et al.

FOREIGN PATENT DOCUMENTS

JP    2001-91717    4/2001
JP    2003-119623   4/2003

OTHER PUBLICATIONS

H. T. Miyazaki, H. Miyazaki, Y. Jimba, Y. Kurokawa, N. Shinya, K. Miyano, 'Light diffraction from a bilayer lattice of microspheres enhanced by specular resonance', J. Appl. Phys., vol. 95, No. 3, Feb. 1, 2004, pp. 793-805.*

Hideki T. Miyazaki, et al., Enhanced light diffraction from a double-layer microsphere lattice, Applied Physics Letters, Nov. 3, 2003, vol. 83, No. 18, pp. 3662-3664.

Hideki T. Miyazaki, et al., Analysis of specular resonance in dielectric bispheres using rigorous and geometrical-optics theories, Journal Optical Society of America, Sep. 2003, vol. 20, No. 9, pp. 1771-1784.

* cited by examiner

*Primary Examiner*—Arnel C Lavarias
(74) *Attorney, Agent, or Firm*—Hamre, Schumann, Mueller & Larson, P.C.

(57) ABSTRACT

A principle of blazing that is effective even in the resonance domain. Light (51) is made incident on a diffraction grating so that specular resonance can occur in two or more light scattering units including, for example, bispheres (11*a*, 21*a*; 12*a*, 22*a*), and by the specular resonance, a fraction of diffracted light 52 that is diffracted by the first layer (1) and the second layer (2) is selectively enhanced. It also becomes possible to tune a blazing condition by a control signal from outside.

15 Claims, 12 Drawing Sheets

LIGHT DIFFRACTION METHOD AND DIFFRACTION DEVICE, DIFFRACTION GRATING USED FOR THEM, AND POSITION ENCODER DEVICE

TECHNICAL FIELD

The present invention relates to a light diffraction method and a diffraction device, a diffraction grating used for the method and device, and a position encoding device. The present invention is particularly useful in the technical fields of spectrum measurement of electromagnetic waves mainly in the optical wavelength range, signal and image measurements involving selecting of a predetermined wavelength, and changing or branching of the propagating direction of electromagnetic waves.

BACKGROUND ART

A diffraction grating is generally a one-dimensional periodic array of protrusions having a triangular or rectangular cross-sectional shape. Depending on the purposes, a two-dimensional periodic array of protrusions or recesses in a pyramidal or rectangular parallelepiped shape also is used as a diffraction grating. Diffraction gratings are classified roughly into two types, a reflective type and a transmission type.

FIG. 17 is a schematic cross-sectional view illustrating one example of a conventional diffraction grating 101. When the period of the grating is greater than half the wavelength of incident light 103, generally diffracted lights 104 and 107 are produced on the reflection side and the transmission side. The angles of these diffracted lights are determined by the wavelength and incident direction of light and the period of grating, so even the light waves that are incident from the same direction can result in diffracted lights in different directions depending on their wavelengths. This principle is utilized in splitting white light into spectra, detecting only the intensity of light with a predetermined wavelength by a light detection device placed in a predetermined direction, and so forth. In a reflective diffraction grating, a metal film is coated on the surface, and therefore, light cannot proceed through to the transmission side. In a transmission diffraction grating, a surface layer 102 for reflecting light is omitted or it is subjected to an anti-reflection coating.

Conventional diffraction gratings have employed the technology of processing its cross section in an appropriate saw-tooth shape to attain high diffraction efficiency. As illustrated in FIG. 17, incident light 103 is divided into reflected lights 105 and refracted lights 106 at a slope of one triangle. In the case of a reflective diffraction grating, the inclination angle and period of the slopes are determined so that the reflected diffraction light with a wavelength that is required to be diffracted efficiently can proceed in the direction coinciding with that of the reflected light. In the case of a transmission diffraction grating, its design is conducted so that the direction of desired transmitting diffraction light coincides with that of refracted light. This optimization of the cross-sectional shape for obtaining high diffraction efficiency is called blazing, and a diffraction grating that is optimized in this way is called a blazed diffraction grating.

The blazing principle discussed above, however, can be applied only to the diffraction grating with a period considerably greater than the wavelength because it utilizes geometrical optical phenomena such as reflection and refraction. This type of diffraction grating is called a diffraction grating in the scalar domain. The diffraction grating in the scalar domain may be satisfactory in the case of using a very high diffraction order or in the case where only a very small angle of diffraction is necessary; however, when a low order and a large angle of diffraction are desired, the period and wavelength should be designed to be close values so as to be different by several times at most. This type of diffraction grating is called a resonance domain diffraction grating. The resonance domain refers to a domain in which the ratio of grating period p to wavelength $\lambda$ is greater than 1 but less than 10 ($1<p/\lambda<10$). Unlike for the scalar domain ($p/\lambda>10$), no clear design theory of blazing has been offered for the resonance domain. For this reason, resonance domain diffraction gratings are designed by solving Maxwell's equations as rigorously as possible to search for a desirable cross-sectional shape.

Fabricating a diffraction grating that is blazed as designed has not yet been so easy to date, even for the one in the scalar domain with a large period. In every age, the best precision processing technology at the time has been employed for the fabrication of diffraction gratings, and consequently, diffraction gratings always have been expensive elements that can be manufactured only by exclusive people. In earlier times, precision processing machines called ruling engines were used, and such equipment that can produce high-quality diffraction gratings was limited even in the world. Although many of them have been replaced with optical interference exposure techniques, highly sophisticated techniques such as special ion etching and precision replication are required for achieving accurate blaze shapes, and the manufacturers that have such techniques are still limited.

JP 2001-91717A discloses a diffraction grating in which microspheres are stacked to form a close-packed structure. Light is made incident on this diffraction grating so that the Mie resonance condition in each sphere and the Bragg condition originating from the periodic structure of the spheres can be satisfied at the same time. The publication describes an example in which light is incident from the direction −48° inclined from the direction normal to a layer (z-axis direction) toward a close-packed array direction in a plane of microspheres (a y-axis direction, for example, in the later-described arrangement shown in FIG. 1). This diffraction grating is obtained by stacking microspheres in a self-assembled manner and can be fabricated relatively easily. The light diffraction utilizing Mie resonance, however, does not yield high diffraction efficiency.

What has been especially inconvenient in using conventional diffraction gratings is the lack of flexibility of the blazing condition. Once the incident direction, diffraction direction, period, required wavelength, and required diffraction order are determined, the appropriate blazing shape can be determined easily. However, when a diffraction grating is used as an optical spectroscope in particular, the diffraction grating is, for example, rotated with respect to the incident light and it must be used even in a condition that falls outside the blazing condition. For this reason, in designing an optical spectroscope, there has been no other option but to limit its use to a specific wavelength as a typically used wavelength, so it has been only within a certain operational range around the specified wavelength for which high efficiency can be guaranteed.

DISCLOSURE OF THE INVENTION

In view of the foregoing circumstances, it is an object of the present invention to offer a novel blazing principle that is simple and effective even in the resonance domain and provide a novel light diffraction method employing the principle, and further open up the way of realizing a high efficiency diffraction grating and light diffraction device relatively easily.

Another object of the invention is, by applying the novel blazing principle, to provide a diffracting grating and a light diffraction device with tunability that can realize optimum blazing condition according to various use conditions by a control signal from outside, and to provide a light diffraction method that makes dynamic tuning possible.

In order to accomplish the foregoing objects, the present invention utilizes specular-resonance-enhanced diffraction in light scattering units.

Accordingly, the present invention provides a light diffraction method using a diffraction grating, wherein: the diffraction grating includes: a first layer including two or more first light scatterers, two or more of which being periodically arrayed along a first direction and either a) two or more of which being arrayed along a second direction or b) extending along the second direction; and a second layer including two or more second light scatterers respectively corresponding to the two or more first light scatterers, the two or more second light scatterers being disposed at positions shifted from the two or more first light scatterers by a predetermined distance along a predetermined direction in a plane that is other than a plane including the first direction and the second direction; the method including: making light incident on the diffraction grating so that: in a case of a), the light is incident along a plane including two or more trajectories selected from trajectories formed by the shifting of the two or more first light scatterers in the predetermined direction; and in both cases of a) and b), specular resonance occurs in two or more light scattering units, each including one light scatterer selected from the two or more first light scatterers and one of the second light scatterers corresponding to the selected one of the first light scatterers, whereby a fraction of diffracted light that is diffracted by the first layer and the second layer is enhanced selectively by the specular resonance in the two or more light scattering units.

The light diffraction device of the present invention is a light diffraction device provided with a diffraction grating, the diffraction grating including the first layer and the second layer described above, and further including a light projecting device for making light incident on the diffraction grating so that specular resonance occurs in the two or more light scattering units also described above. In this diffraction device as well, a fraction of diffracted light that is diffracted by the first layer and the second layer is enhanced selectively by the specular resonance in the two or more light scattering units. The light projecting device is not limited to a light-emitting device that serves as a light source but may include various components that can be used for introducing light thereto.

The present invention provides a novel light diffraction method and diffraction device employing the specular resonance phenomenon as the blazing principle, and further provides a novel diffraction grating used therefor. Utilizing the phenomenon of enhancement of diffracted light by specular resonance (specular-resonance-enhanced diffraction) makes it possible to achieve high diffraction efficiency relatively easily. Moreover, it also becomes possible to offer tunability by a control signal from outside.

BEST MODE FOR CARRYING OUT THE INVENTION

Figure 1A:
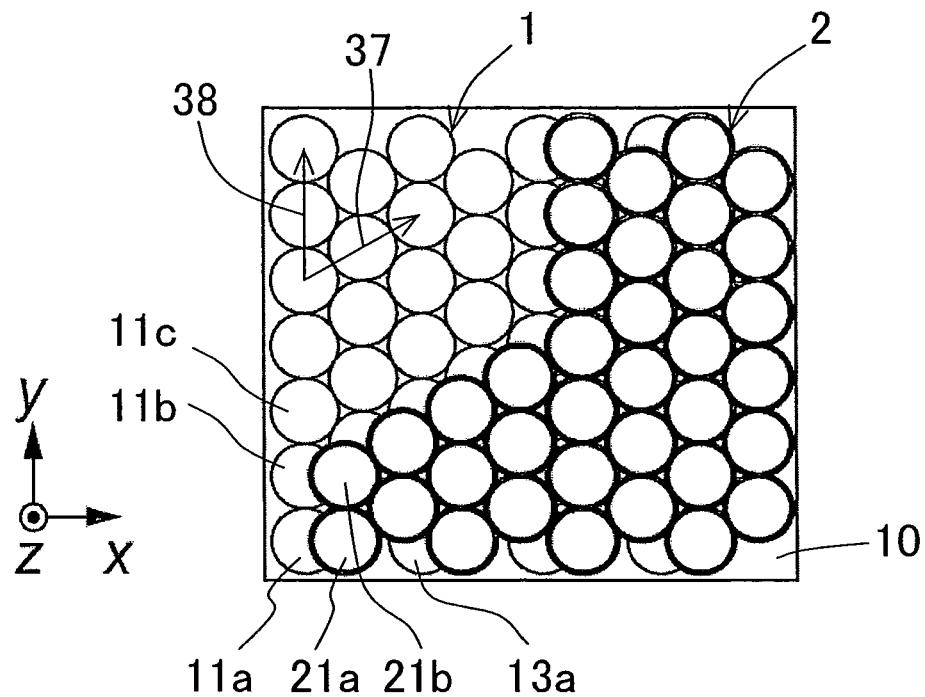
FIG. 1A is a plan view illustrating one embodiment of the diffraction grating that can be used for the light diffraction method and the light diffraction device according to the present invention.

Specular resonance is a scattering phenomenon in which, typically, when two transparent spheres having a relative refractive index of from 1.2 to 2.2 with respect to the surrounding medium are in close contact or in proximity with each other, a light beam obliquely incident on the axis connecting the centers of the two transparent spheres undergoes intense specular reflection as if a mirror is placed at the position of the axis. The specular reflection occurs when two spheres have the same diameter. When two spheres have different diameters, light goes out in a specific direction determined by the ratio of the diameters and the incident direction (this case is also called specular resonance because the two phenomena are essentially based on the same principle, although in this case the direction of reflection is not precisely the direction of specular reflection).

The diameter range of the spheres that exhibit specular resonance is very wide; for visible light with a wavelength of from about 400 nm to about 700 nm, for example, specular resonance can be observed with from microspheres having a diameter of about 1 µm to infinitely large spheres. This phenomenon can be approximately paraphrased as a light refraction phenomenon that occurs at the interface between two circular shapes and therefore also can be observed not only with spheres but also with cylinders that are in close contact or in proximity with one another with their axes being parallel.

Here, in two light scatterers such as spheres and cylinders, the incident side functions as a focusing lens for focusing incident collimated light and while the emission side functions as a collimating lens for restoring it to collimated light. Thus, specular resonance can be defined in a broader sense as the phenomenon in which two appropriately disposed lenses cause a light beam obliquely incident on the axis connecting the centers of the two lenses to undergo intense specular reflection as if a mirror is placed at the axis. Unlike Mie resonance, specular resonance is the phenomenon unique to two light scatterers and it cannot be realized by the interactions caused in one light scatterer or three light scatterers.

Next, specular resonance-enhanced diffraction is a phenomenon in which intense diffracted light is obtained in a structure body made of a periodic array of light scattering units that exhibit specular resonance, for example, light scattering units made of two spheres or two lenses, for such directions in the case that the diffracted light resulting from the periodic structure in the structure body overlaps with the specular resonance light produced by each scattering unit, preferably in the case that the direction of the diffracted light coincides with the direction of the specular resonance light.

The structure body that attains specular resonance-enhanced diffraction can be formed by periodically arraying the light scatterers two-dimensionally (along two predetermined directions) in cases where the light scatterers are in an axially symmetrical shape, such as in the case of spheres and spherical lenses. In cases where the light scatterers are approximately in a plane symmetrical shape, such as in the case of cylinders and cylindrical lenses, it can be formed by periodically arraying them one-dimensionally (along one predetermined direction).

As for the specular resonance-enhanced diffraction, the scattering phenomenon of specular resonance works as the blazing principle for diffraction gratings. The specular resonance phenomenon occurs with a sphere, cylinder, lens, or the like in a size slightly larger than the wavelength (specifically, a general guideline is a diameter that is 1.6 times or greater the wavelength), and is therefore effective also for diffraction gratings in the resonance domain with those being arrayed nearly in a close-packed configuration.

The simplest system that causes the specular resonance enhancement phenomenon is a bilayer close-packed structure of spheres or cylinders. Such a structure can be realized by self-assembled aggregation of colloidal particles or fibers, without requiring highly sophisticated process techniques. Moreover, in the specular resonance enhancement phenomenon, the blazing condition is determined by the relative arrangement of two objects, not the fixed shapes in conventional blazed diffraction gratings; therefore, by controlling the relative arrangement from outside, tunability can be introduced to the blazing condition.

Hereinbelow, preferred embodiments of the diffraction method and diffraction device according to the present invention are described.

The light diffraction method according to the invention further may include the step of changing at least one selected from a relative positional relationship between the first layer and the second layer, and an incident angle of light on the diffraction grating, to change diffracted light that is to be enhanced selectively. With this step, dynamic tunability can be introduced. If light is diffracted according to the above-described light diffraction method after this step, it is possible to enhance a diffracted light that is different from the one that has been enhanced previously.

In the light diffraction method of the invention, it is preferable that diffracted light with a single order be enhanced selectively, although diffracted light with a plurality of orders may be enhanced simultaneously. The conditions for realizing this preferable enhancement will be discussed later.

In the light diffraction method of the invention, diffracted light in a predetermined wavelength range may be enhanced selectively. It is possible to perform the step of changing diffracted light to be enhanced to change the wavelength range to be enhanced selectively.

In order to introduce tunability to the blazing condition, it is preferable that the light diffraction device of the invention further include a driving device for changing at least one selected from a relative positional relationship between the first layer and the second layer, and an incident angle of light on the diffraction grating.

The light diffraction device of the invention further may include at least one light detection device for detecting diffracted light that has been enhanced selectively. This diffraction device may be used as, for example, a position encoding device. This position encoding device is characterized in that: it includes the just-noted light diffraction device provided with at least one light detection device, a first member, and a second member; the first member and the second member are connected to the first layer and the second layer, respectively; and the at least one light detection device detects the intensity of diffracted light that changes according to relative positions of the first layer and the second layer, to detect the relative positional relationship between the first member and the second member.

Hereinbelow, a novel diffraction grating provided by the invention is described.

The diffraction grating according to the invention is, for example, characterized by including: a first layer including two or more first light scatterers disposed in the manner as described in the foregoing and a second layer including two or more second light scatterers also disposed in the manner as described in the foregoing; wherein the diffraction grating has two or more light scattering units, in each of which one light scatterer selected from the two or more first light scatterers and one of the second light scatterers corresponding to the selected one of the first light scatterers are disposed adjacent to each other so that incident light can cause specular resonance; and the two or more first light scatterers and the two or more second light scatterers respectively in the first layer and the second layer are disposed spaced apart from each other.

By utilizing the arrangement of spaced light scatterers, it becomes easy to adjust of the angle formed by the incident light and the axis connecting the centers of a pair of light scatterers, and the range of selection of the blazing condition widens. The arrangement of spaced light scatterers is suitable also for the use in which the first layer and the second layer are allowed to shift relatively.

This diffraction grating may have a first substrate for retaining the two or more first light scatterers, a second substrate for retaining the two or more second light scatterers, and a gap-retaining member for retaining the first substrate and the second substrate so as to be spaced apart from each other. The diffraction grating further may include a driving device for changing the relative positional relationship between the first layer and the second layer.

Another embodiment of the diffraction grating according to the invention includes, as in the foregoing, a first layer including two or more first light scatterers and a second layer including two or more second light scatterers, and further has two or more light scattering units, in each of which a pair of light scatterers are disposed adjacent to each other so that specular resonance can occur. This diffraction grating is characterized in that the two or more first light scatterers and the two or more second light scatterers are disposed so as to be in contact with each other, and at least one selected from the two or more first light scatterers and the two or more second light scatterers has a shape other than a sphere, or both the two or more first light scatterers and the two or more second light scatterers are spheres but are disposed so as to form a structure other than a close-packed structure.

Figure 6A:
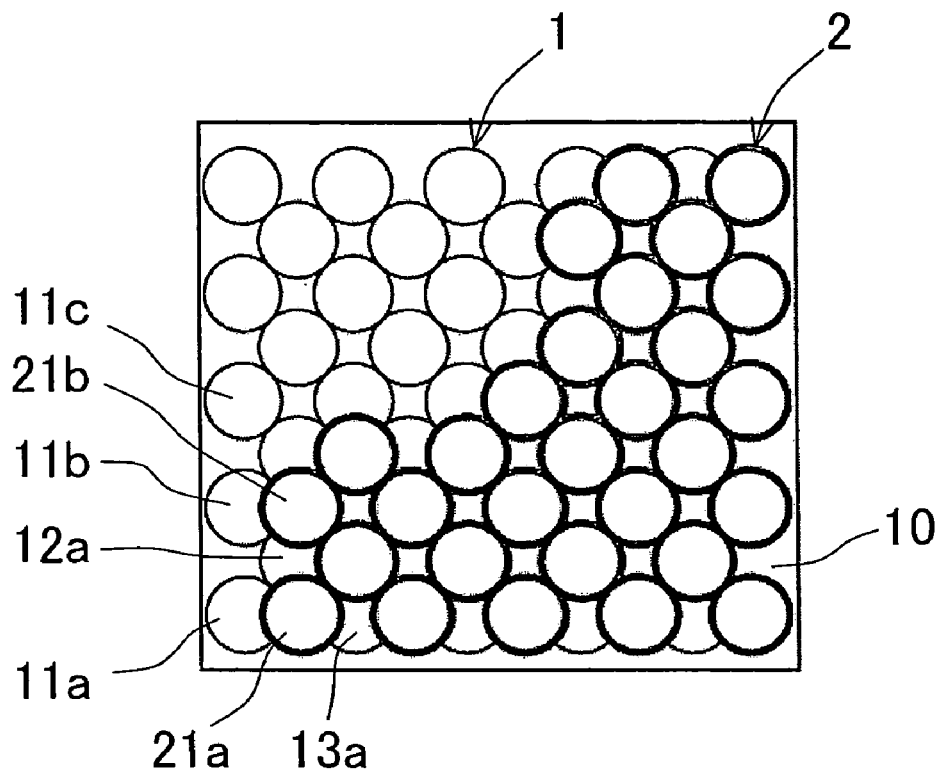
FIG. 6A is a plan view illustrating another embodiment of the diffraction grating that can be used for the light diffraction method and the light diffraction device according to the present invention.
Figure 6B:
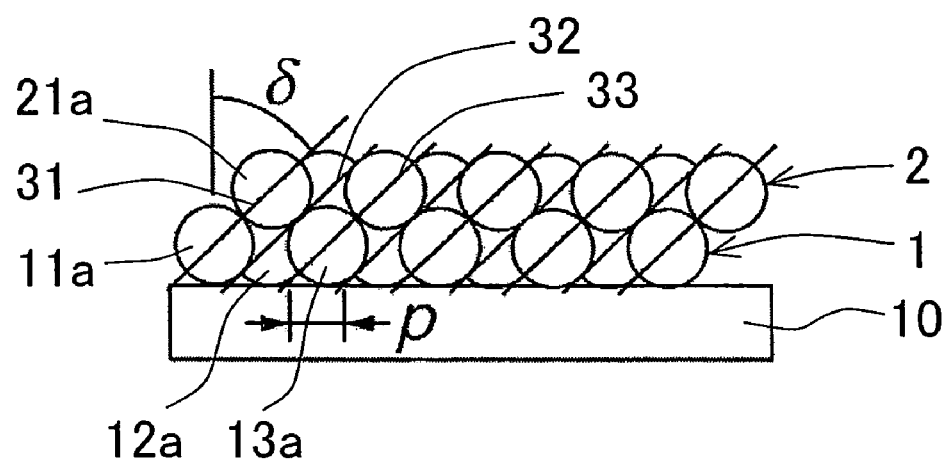
FIG. 6B is a cross-sectional view of that embodiment. The diffraction grating illustrated in FIGS. 6A and 6B is also one example of the diffraction grating according to the present invention.

The shape other than a sphere may include, but is not particularly limited to, an aspherical lens. The two or more first light scatterers and the two or more second light scatterers may be a columnar structure, for example, a cylinder (a tube) that extends along the second direction. One example of the structure other than the close-packed structure includes, but is not limited to, a later-described structure of tetragonal lattice (FIGS. 6A and 6B). Preferable examples of the light scatterers include spheres or cylinders with equal diameters and refractive indices, and lenses with equal focal distances.

The present invention also provides a light diffraction device including a diffraction grating according to the invention, and an optical component integrated with the diffraction grating. Examples of the optical component include a prism and an optical waveguide.

Hereinbelow, embodiments of the present invention are described with reference to the drawings.

Figure 1B:
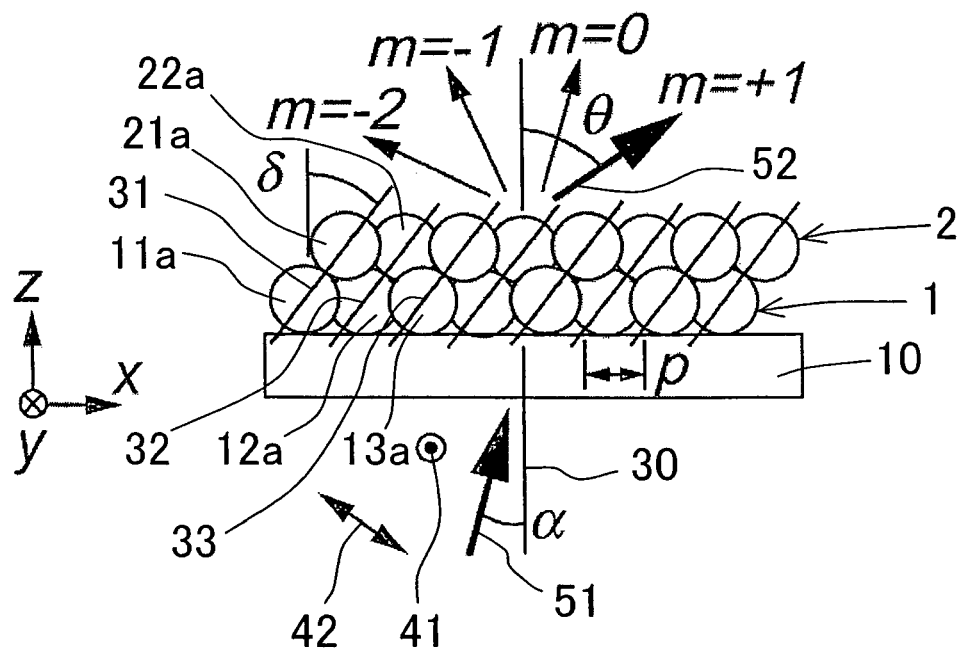
FIG. 1B is a cross-sectional view of the embodiment.

The structure of the diffracting grating shown in FIGS. 1A and 1B can be realized by, for example, a bilayer close-packed crystal of transparent microspheres (light scatterers) with a diameter of about 1 µm on a transparent substrate. Transparent microspheres are readily available as those made of polystyrene or silica with a uniform diameter are manufactured as spacer particles for liquid crystal displays and reagents for physical and chemical research. The bilayer close-packed crystal can be fabricated easily without using special fabrication equipment. That is because particles that are uniform in their size and shape inherently tend to array themselves periodically in a self-assembled manner to crystallize. It should be noted that in the present invention, there are no limitations to the shape and material of the light scatterers as far as the diffracted light enhancement through specular resonance can be realized. The same applies to the material for the substrate.

In a first layer 1 and a second layer 2 formed on a surface (xy plane) of a substrate 10, spheres serving as the light scatterers form a triangular lattice parallel to the xy plane with one side of which being parallel to the y axis. The array of the second layer 2 can be regarded as the one obtained by shifting the array of the first layer 1 in the x-axis direction by a predetermined distance.

In the first layer 1, spheres 11a and 13a are arrayed along the x-axis direction, and spheres 11a, 11b, and 11c are continuously arrayed along the y-axis direction. The y-axis direction is the close-packed array direction in the layer. Another direction in which spheres are arrayed in a close-packed manner is the direction 30° inclined from the x-axis direction toward the y-axis direction.

The structure disclosed in FIGS. 1A and 1B can be regarded as that in which spheres (the second light scatterers) 21a-21b, and 22a in the second layer 2 are disposed at positions where spheres (the first light scatterer) 11a-11b, and 12a in the first layer 1, which are two or more respective spheres arrayed periodically and continuously in a first direction (for example, the direction 30° inclined from the x-axis direction toward the y-axis direction: 37) and in a second direction (for example, the y-axis direction: 38), are shifted in a predetermined direction that is within a plane other than the plane including the first direction and the second direction (for example, the direction included within the xz plane).

In this way, one to one correspondence exists between the first light scatterers and the second light scatterers. For example, the sphere 11a corresponds to the sphere 21a, the sphere 12a to the sphere 22a, and the sphere 11b to the sphere 21b, respectively. It is however not necessary that the spheres in the second layer 2 correspond to all the spheres in the first layer 1.

Two spheres that have correspondence and are in contact with each other form a bisphere parallel to the plane including the predetermined direction (the xz plane). The bispheres have axes 31 to 33 inclined from the z-axis by an angle $\delta$ (the axes connecting the centers of the scatterers), and are periodically arrayed along the x-axis direction at a period p. In this diffraction grating, these bispheres function as light scattering units for scattering light by specular resonance. In the xz plane, bispheres' axes 31 to 33 can be considered as specular surfaces when the light scattering by specular resonance is regarded as reflection. Such imaginary specular surfaces are arrayed periodically so that the planes are parallel to one another along the x-axis direction but that a common plane forms along the y-axis direction.

In this embodiment, $\delta=35.3°$. Assuming that the diameter of the spheres is D, the relationship p=0.866D will hold. As will be discussed later, the relationship of D with $\delta$ and p changes depending on the configuration and arrangement of the crystal.

When light $k_i$ 51 with a wavelength $\lambda$ is incident from the direction (30) normal to the substrate (the z-axis direction) along the xz plane at an incident angle $\alpha$, the direction $\theta$ that produces diffracted light $k_o$ 52 in the xz plane is given by the so-called grating equation $\sin\theta=\sin\alpha+m\lambda/p$, where m is an integer and a diffraction order.

At this time, the condition in which specular resonance occurs in each bisphere is $\theta=2\delta-\alpha$. Therefore, the condition in which the direction of specular resonance light and that of diffracted light match can be expressed as $2\cos\delta\sin(\delta-\alpha)=m\lambda/p$. In the embodiment shown in FIGS. 1A and 1B, the foregoing relation is satisfied when m=+1, and thus, diffracted light 52 with this order is enhanced by specular resonance.

The light incident direction in which diffracted light is enhanced by specular resonance is not limited to the foregoing. However, to obtain high diffraction efficiency by enhancing diffracted light through specular-resonance-enhanced diffraction, it is desirable that the incident light 51 be introduced to the diffraction grating along a plane including two or more trajectories of the light scatterers when the light scatterers in the first layer are assumed to be shifted to the light scatterers in the second layer. The just-noted "plane" in the embodiment illustrated in the drawing includes planes including two or more axes of the bispheres, for example, a plane including axes (31 and 32; 32 and 33; or 31 and 33), preferably the planes that define the shifting direction of the light scatterers (the xz plane; the plane including the axes 31 and 33). The light incidence from the direction that is inclined from the z-axis direction toward the y-axis direction as disclosed in JP 2001-91717A is not the incidence along the foregoing "plane."

While there are countless conditions that satisfy the foregoing relationship, some restrictions need to be considered in reality. First, there is a limit on the range of the incident angle at which specular resonance occurs with the bisphere's axis, and generally, it is desirable that $0° \leq |\delta - \alpha| \leq 30°$ holds.

In addition, it is preferable that only a single order diffracted light be enhanced for high efficiency diffraction. If a plurality of diffracted lights are enhanced, the energy distributed per single diffracted light will decrease. If it is assumed that $\alpha = 0$ and $m = 1$ for simplicity, the angle gap $\Theta$ between the transmitted light ($m = 0$) and this diffracted light is $\Theta = \sin^{-1}(\lambda/p)$. Where the angular width (full width at half maximum) of the specular resonance light from a bisphere is denoted as $\Delta\theta$, several diffracted lights are enhanced simultaneously when $\Delta\theta > \Theta$.

Figure 2:
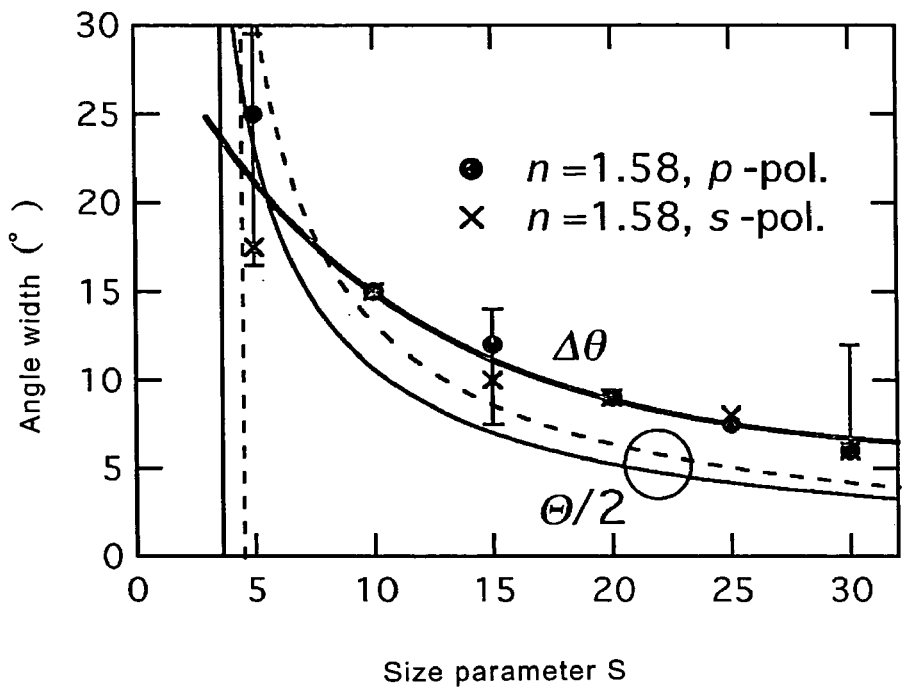
FIG. 2 is a graph for illustrating the conditions in which only the diffracted light with a single order is enhanced by specular resonance.

Let us assume that the criterion for enhancing only one diffracted light is $\Delta\theta \leq \Theta/2$. FIG. 2 illustrates the range that satisfies this condition. $\Delta\theta$ in this figure was obtained by averaging the angle width of the specular resonance peak for various $\alpha$ values with bispheres having various sphere sizes D (size parameter S is expressed normalized by $S = \pi D/\lambda$) and refractive indices n. FIG. 2 shows the fitting curve of $\Delta\theta$ for $n = 1.58$ (average for both polarizations). The ranges of distribution of $\Delta\theta$ values for various n (1.3 to 2.1) at several S values also are expressed with bars, which are roughly distributed around the fitting curve. FIG. 2 also shows $\Theta/2$. The solid line represents the case of bilayer close-packed crystal, which is being discussed now, and the dashed line will be discussed later. The vertical line (solid line) near S=4 represents the diffraction limit, and with S values less than that, $\Theta$ does not exist. In other words, diffraction takes place no longer. In addition, the lower limit of the range in which specular resonance occurs is about S=5.

From the foregoing, it will be appreciated that the range of S that fulfills the criterion $\Delta\theta \leq \Theta/2$ and in which specular resonance occurs is a very narrow range in the vicinity of S=5. This criterion $\Delta\theta \leq \Theta/2$ is not absolute but may be defined arbitrarily according to the required diffraction properties. Generally, the range of S=about 5 to about 10 is considered the range in which particularly useful diffraction gratings exist with which one diffracted light is enhanced selectively. This range corresponds to D=0.8-1.6 µm for visible light with $\lambda = 0.5$ µm, and D=2.5-5 µm for an optical communication wavelength of $\lambda = 1.55$ µm.

Figure 3:
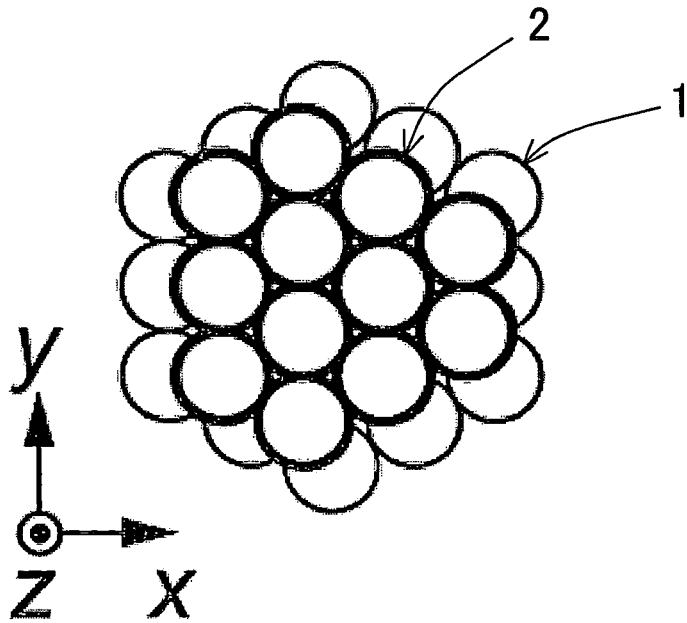
FIG. 3 is a plan view illustrating the array of polymer microspheres with a diameter of 2.1 µm and a refractive index of 1.58, used for an experiment.

We have confirmed through an experiment that specular-resonance-enhanced diffraction actually occurred and high diffraction efficiency comparable to conventional diffraction gratings resulted. Polymer microspheres with D=2.1 µm and n=1.58 were stacked as illustrated in FIG. 3 by a micromanipulation method to form the first layer 1 and the second layer 2.

Figure 4:
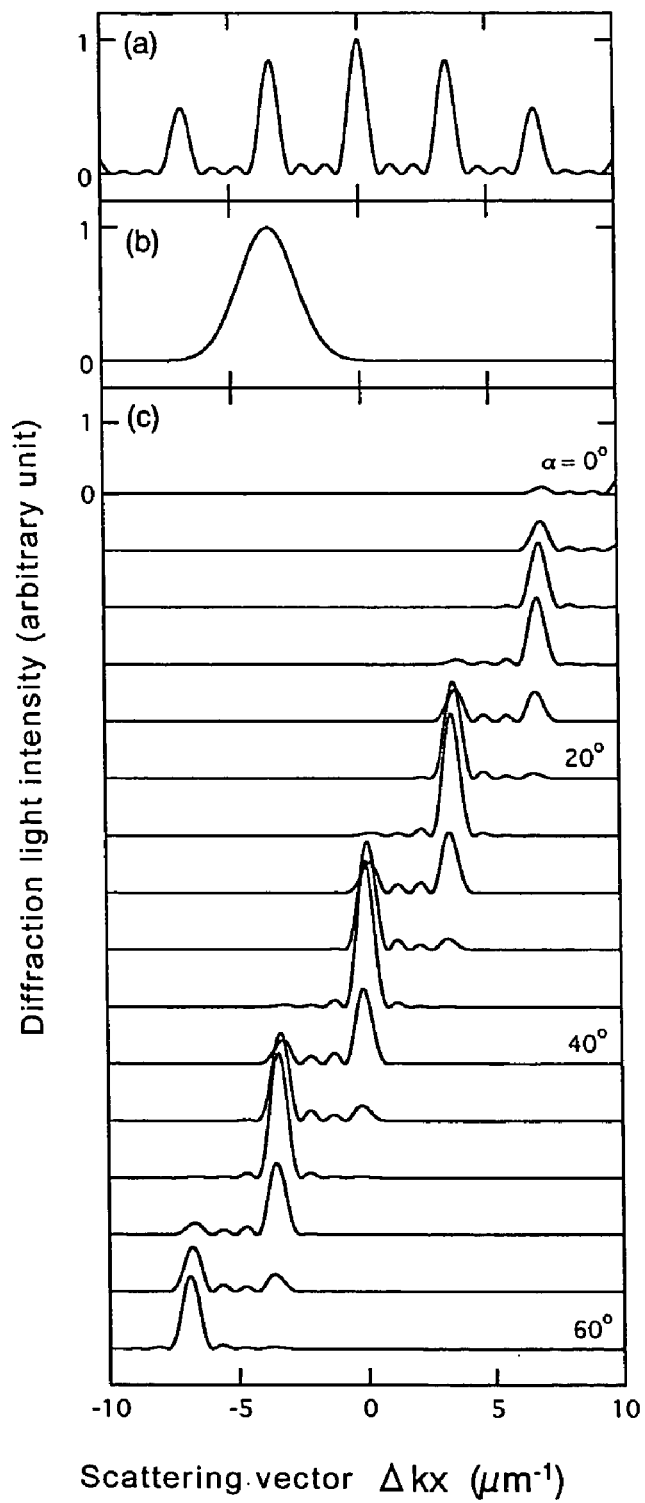
FIG. 4 is a graph illustrating the intensity profile in the xz plane according to the diffraction theory taking specular resonance into account as a structure factor, wherein (a) is a diffraction function taking the finiteness of the lattices used in an experiment, (b) is a structure factor representing specular resonance, and (c) is a luminance profile at various incident angles α.

The intensity profile in the xz plane obtained when light with a wavelength $\lambda = 0.633$ µm (corresponding to S=10.4) is incident on this diffraction grating at various angles $\alpha$ within the xz plane is considered. FIG. 4 illustrates theoretical projections. FIG. 4(a) is an intensity profile taking into account the diffraction that occurs when a finite number of scatterers are arrayed with a period p. Here, the horizontal axis represents the x component of scattering vector $\Delta k = k_o - k_i$. In this notation, the direction in which diffracted light occurs is constant and not dependent on the incident angle, and the diffracted light (transmitted light) of m=0 always sits at the center at all times. The effect of specular resonance from the bisphere is added thereto. Since specular resonance is the distribution of scattering intensities from individual scatterers, it can be treated as a structure factor in the diffraction theory. From FIG. 2, it will be derived that $\Delta\theta = 15°$ with the just-mentioned S and n, the structure factor can be approximated as a Gaussian distribution with that half-width. FIG. 4(b) shows the result. This peak moves leftward or rightward according to $\alpha$.

Multiplying FIG. 4(a) and FIG. 4(b) yields the definitive intensity profile of FIG. 4(c). It will be appreciated that diffracted lights with various orders are enhanced selectively one after another as the incident angle a is varied. It can be explained that even though the diffraction grating is the one that causes a number of diffracted lights with various orders at the same time as shown by FIG. 4(a), the profile shown by FIG. 4(c) results because it has the blazing effect shown by FIG. 4(b).

Figure 5:
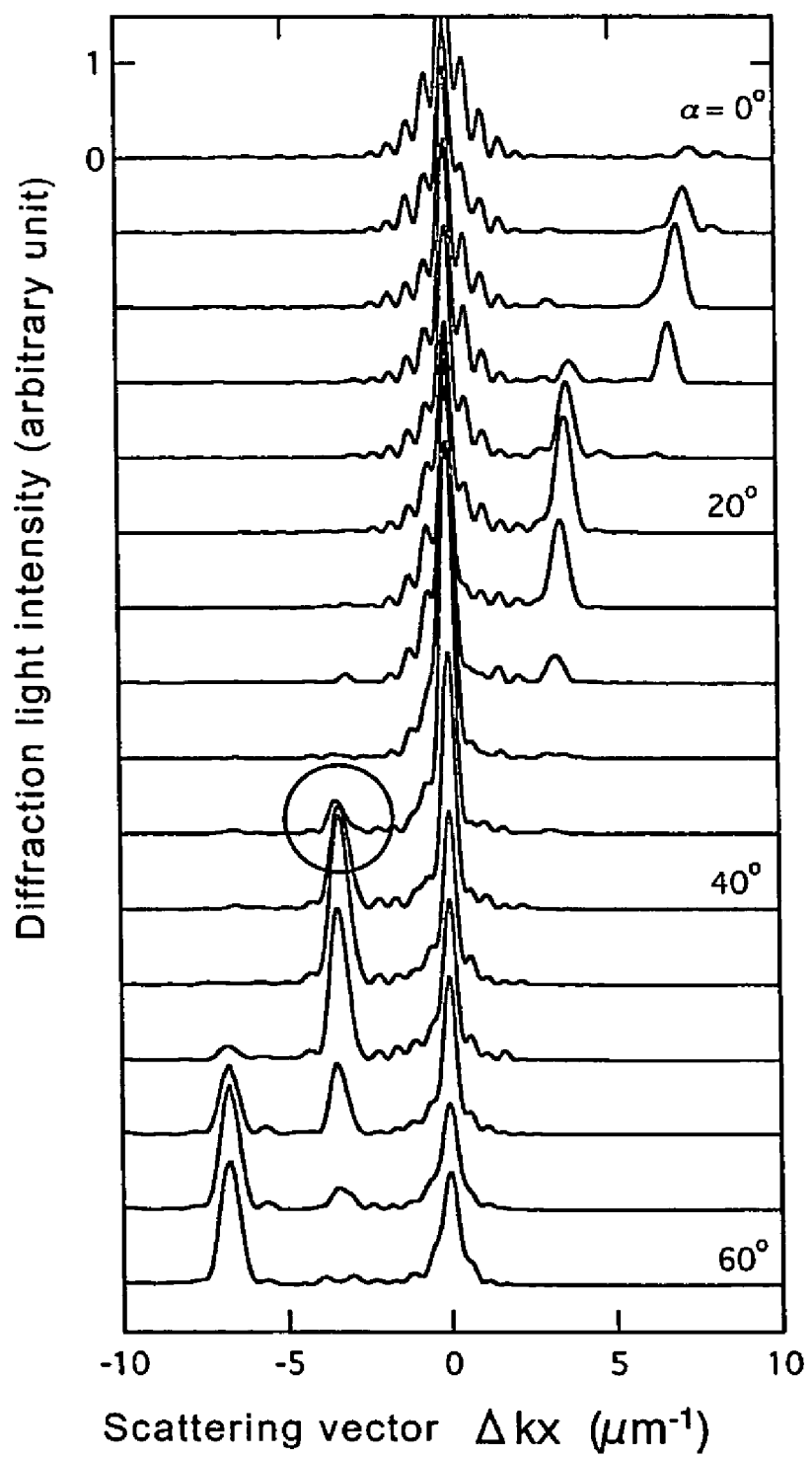
FIG. 5 is a graph illustrating the intensity profile in the xz plane obtained by an experiment.

FIG. 5 illustrates the results of actual measurement of the foregoing. Since the size of the crystal within the plane is limited in the experiment and thus the transmitted light for the peripheral margin portions overlap, the peak for m=0 cannot be compared with that of FIG. 4(c). Nevertheless, the rest of the portions are in good agreement, which demonstrates that the specular resonance diffraction phenomenon occurred as expected. Two peaks with similar intensities may appear at the same time for some of $\alpha$, but this is because the S is set at a relatively large value, slightly exceeding 10.

At this time, the diffraction efficiency was greatest under the condition indicated by the circle in FIG. 5, 55% for p polarization (FIG. 1: 42) and 52% for s polarization (FIG. 1: 41). Considering that conventional blazed transmission diffraction gratings typically show diffraction efficiencies of 50-80%, almost the same degree of efficiency already has been attained. Moreover, excellent characteristics as a diffraction grating already have been provided in that the difference in diffraction efficiency that is dependent on polarization is small. However, no optimization was conducted for the arrayed structure used in the experiment. If D and n are selected appropriately according to the used wavelength $\lambda$ based on calculations and systematic experimental results, even higher diffraction efficiency will be obtained.

Although a close-packed crystal (structure), which is easily fabricated by self-assembly techniques, has been chosen as the subject in the description hereinabove, specular resonance diffraction may occur similarly with other structures. FIGS. 6A and 6B illustrate an example in which a tetragonal lattice is used in place of triangular lattice. It should be noted that explanations for reference numerals in the following drawings may be omitted for those described already.

In this case as well, spheres that are light scatterers are disposed in such orientations that bispheres are positioned within the xz plane, in other words, axes 31 and 33 are positioned within the xz plane. In this embodiment, δ=45° and p=0.707D. The dashed line in FIG. 2 represents Θ/2 and the diffraction limit in this case. The tetragonal lattice has a slightly wider range that satisfies the condition in which only a single diffracted light is enhanced than that of the triangular lattice. It is difficult to form a tetragonal lattice on a smooth substrate by self-assembling because the tetragonal lattice is not close-packed in a plane, but if recesses in which the lower portions of spheres fit are processed in the surface of the substrate, it can be fabricated by self-assembling.

Figure 7A:
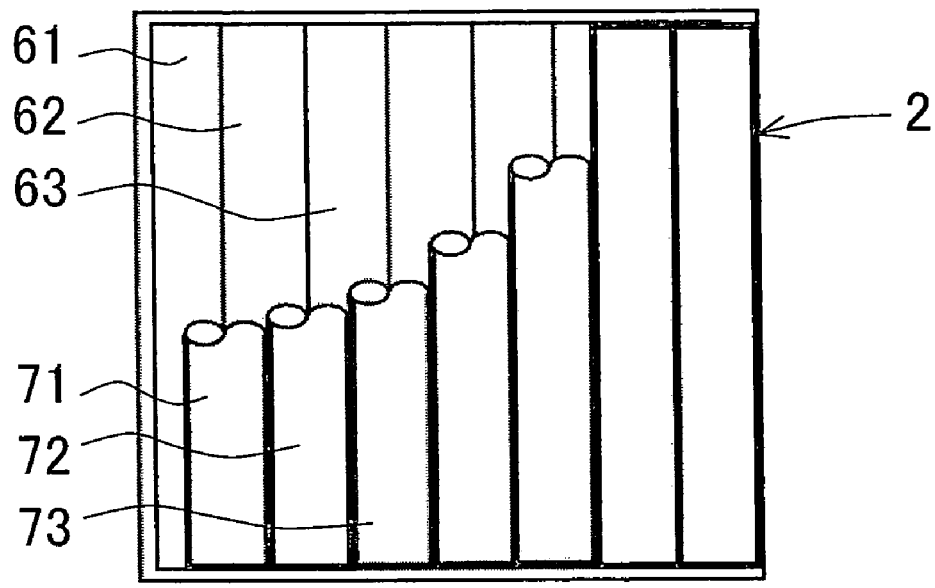
FIG. 7A is a plan view illustrating one embodiment of the diffraction grating using fibers (columnar structure) as the light scatterers.
Figure 7B:
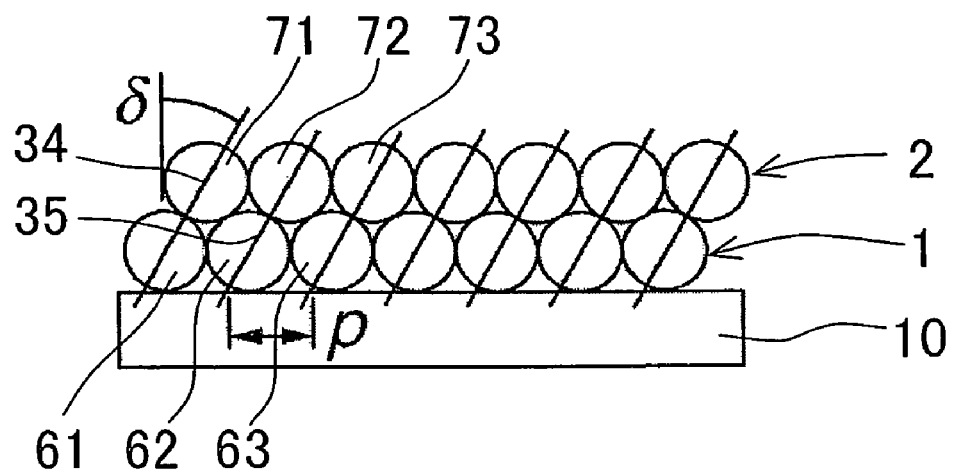
FIG. 7B is a cross-sectional view illustrating the embodiment. The diffraction grating illustrated in FIGS. 7A and 7B is also another example of the diffraction grating according to the present invention.

FIGS. 7A and 7B illustrate a diffraction grating obtained by closely packing, not spheres, but cylindrical fibers as light scatterers. In this embodiment, δ=30° and p=D. In this embodiment, light scatterers are not arrayed along the y-axis direction (the second direction), but fibers 61, 62, 63 and fibers 71, 72, 73 that serve as the first light scatterers and the second light scatterers, respectively, extend along the second direction. These fibers are periodically arrayed along the x-axis direction (the first direction).

When columnar structures such as cylinders are used as the light scatterers, it is recommended that the light incident direction on the diffraction grating be a direction other than the direction obtained by shifting the light scatterers 61, 62, and 63 in the first layer 1 toward the light scatterers 71, 72, and 73 in the second layer 2 (the same direction as the axes 34 and 35, which represents the inclination). The preferable light incident direction in this case is also the direction along a plane including two or more trajectories selected from the trajectories formed by the shifting of the two or more first light scatterers in a predetermined direction, preferably a direction within the xz plane.

All the embodiments illustrated above are ones in which light scatterers such as spheres or cylinders are stacked on a transparent substrate while they are in close contact with one another, but it is possible to eliminate the substrate and retain the structure with the array structure of spheres in a self-standing manner. In other words, the substrate is not essential for the diffraction grating of the present invention. The diffraction conditions and specular resonance conditions are determined by wave vector components in the xy plane, and the xy components of wave vectors are preserved irrespective of the presence or absence of a substrate; therefore, the absence of the substrate makes no difference in operating conditions.

Moreover, the light scatterers in the first layer and the second layer are illustrated to have the same shape in the embodiments presented in the foregoing, but this is not meant to be limiting. In the present specification, the term "trajectory" is meant to be a term that simply means a direction of positional shift (for example, the shifting of the center of a lens), and is not meant to be the term that signifies the identicalness of the shapes of light scatterers. Also, the term "periodically" is not limited to mean the condition in which light scatterers are disposed making close contact with one another, but is intended to include the condition in which light scatterers are disposed keeping predetermined gaps therebetween while not being in contact with one another.

The diffraction grating may be constructed using two substrates. In the embodiment illustrated in FIG. 8, layers 1 and 2 of monolayer close-packed crystals of spheres are formed on two transparent substrates 10a and 10b. These substrates 10a and 10b are fixed by adhesive 4 with the substrates being opposed so that the layers 1 and 2 face each other, while an appropriate gap is kept therebetween by gap-retaining members 3. In this diffraction grating, respective light scatterers 11a, 12a; and 21a, 22a, which constitute the layers 1 and 2, are disposed to be spaced apart from each other by the gap-retaining members 3 for spacing and retaining the first substrate 10a and the second substrate 10b.

Figure 8:
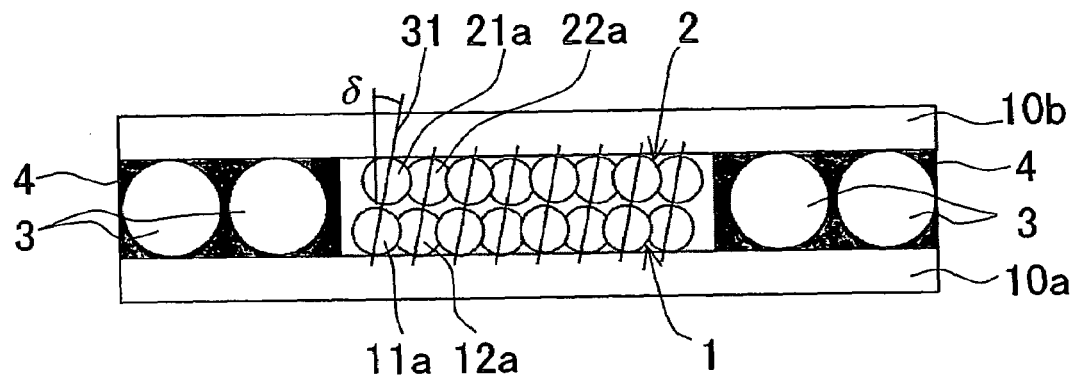
FIG. 8 is a cross-sectional view illustrating, as still another example of the diffraction grating according to the present invention, a diffraction grating in which light scatterers in the layers are spaced apart.

Although the diffraction gratings in which the first layer and the second layer are in close contact with each other can be fabricated easily, the inclination angle .delta. of the bisphere units in the xz plane cannot be selected arbitrarily. In contrast to this, the diffraction grating illustrated in FIG. 8 can realize arbitrary δ by the position matching in a plane. This diffraction grating requires precise controlling of the gap between the two substrates 10a and 10b, but the techniques of securing two flat surfaces at a small gap on the order of micrometers already have been in commercial use for liquid crystal displays and stacked diffraction optical elements for camera lenses. Specifically, it is recommended that silica spheres with a uniform particle size or glass micro-rods may be mixed as spacers in peripheral adhesive portions, or protrusions serving as spacers may be formed in peripheral portions by a molding process. FIG. 8 illustrates silica sphere spacers as an example of the gap-retaining members 3.

Figure 9:
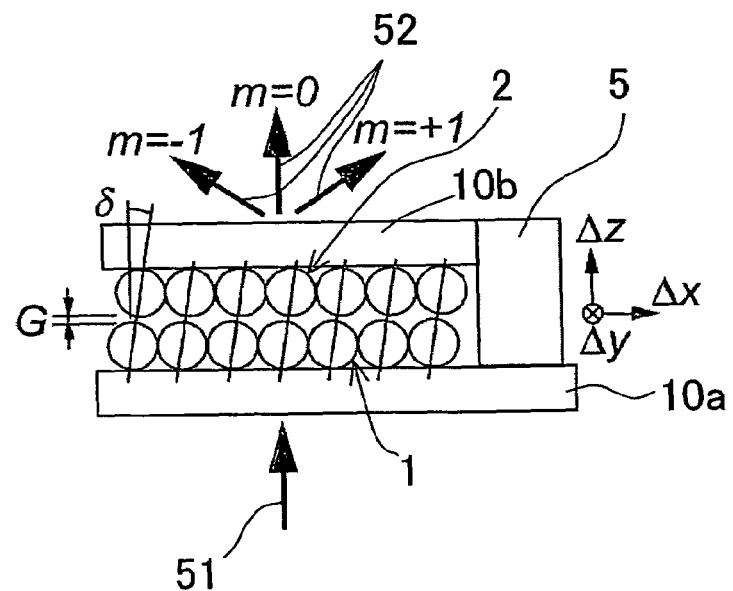
FIG. 9 is a cross-sectional view illustrating, as yet another example of the diffraction grating according to the present invention, a diffraction grating provided with a driving device.

FIG. 9 illustrates another example of the diffraction grating in which the respective light scatterers in the first layer and the second layer are disposed to be spaced apart from each other. Herein, the case of one-dimensional array of cylinders is illustrated for simplicity, but the same applies to two-dimensional arrays of light scatterers such as spheres. The diffraction grating of FIG. 9 further includes a driving device 5 so that the driving device 5 can cause the layers to shift relatively. Specifically, it is recommended to use a piezoelectric element, an electrostatic actuator fabricated by a semiconductor process technique called MEMS (microelectro-mechanical system), or the like as the driving device 5.

Hereinbelow, the functions that can be realized by the relative shifting of the layers will be discussed.

The first function is dynamic switching for the order of diffracted light. Assuming α=0 for simplicity, the direction in which the diffracted light 52 with an order m occurs is represented as $\theta_m=\sin^{-1}(m\lambda/p)$. If the second layer 2 is shifted by Δx with respect to the first layer 1, the angle that bispheres form with respect to the incident light 51 is $\delta=\tan^{-1}(\Delta x/(D+G))$, where G represents the distance between the cylinder surfaces between the layers. If Δx exceeds p, the same situation is repeated, so $|\Delta x|\leq p/2$. If Δx is selected so that $\theta_m=2\delta$, it will be possible to enhance diffracted light with a specific order m. Here, if it is assumed D>>G, $\theta_m\approx\sin\theta_m$, $\delta\approx\tan\delta$, and D≈p, Δx that enables the m-order light to be enhanced can be expressed as $\Delta x\approx m\lambda/2$. If it is thought that λ=500 nm and m=±1, the range of Δx is ±250 nm. Approximately the same range will result from the condition $|\Delta x|\leq p/2$. This means that by merely shifting the first layer 1 and the second layer 2 in the range of ±250 nm with the driving device 5, it becomes possible to enhance selectively only one of the diffracted lights 52 that proceed in three directions m=−1, 0, and +1. The shifting to this degree can be realized easily even with a piezoelectric element or MEMS actuator.

Figure 10:
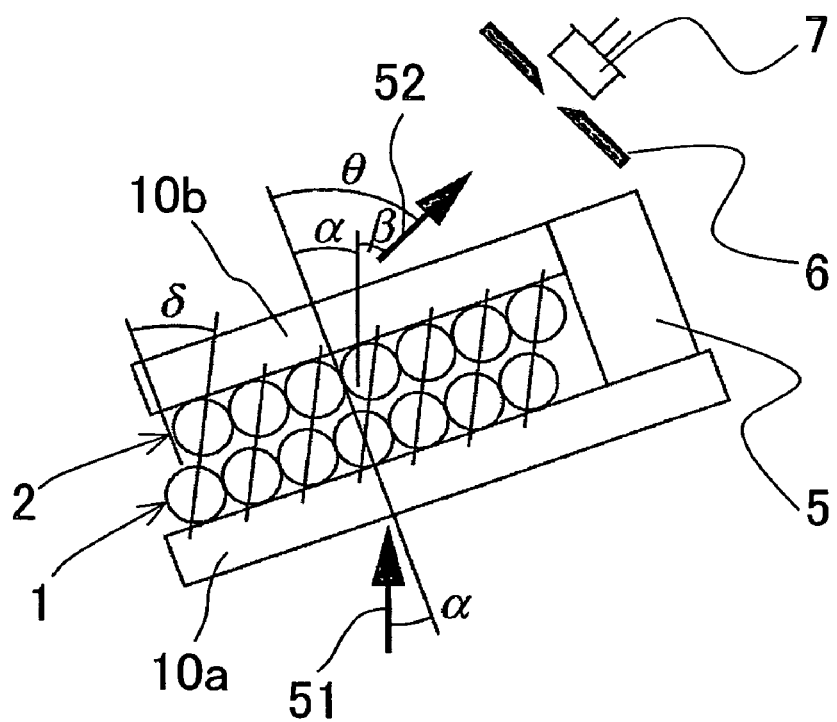
FIG. 10 is a cross-sectional view illustrating, as one example of the light diffraction method according to the present invention, that a blazing condition can be satisfied by an arbitrary incident condition.

The second function is a function to satisfy the blazing condition and guarantee high efficiency diffraction constantly for various wavelengths λ. An example is considered in which white incident light is decomposed spectrally with this diffraction grating and the light with a wavelength λ is taken out by letting it through a slit, to measure the intensity thereof. Selecting of λ can be effected by, for example, rotating the diffraction grating with respect to the incident light 51 (varying α). As illustrated in FIG. 10, a slit 6 is fixed in the direction of β from the incident direction, θ−α=β. From the grating equation, α should be chosen so that sin(α+β)−sin α=mλ/p. If the specular resonance condition needs to be satisfied at the same time, δ=α+β/2. In other words, by determining α, δ is also determined, and if Δx is adjusted to be so, it will mean that blazing is always carried out for the wavelength λ that is to be measured. Since conventional diffraction gratings have been unable to change the blazing condition dynamically in this way, they have satisfied the blazing condition only at a typical wavelength used and a compromise always has been made with other wavelengths at a lower efficiency.

Considering that the driving as described above is performed with a MEMS actuator, the use of a self-assembled array of spheres or cylinders for the diffraction grating is not very realistic. In specular resonance, the spheres or cylinders on the incident side work as a focusing lens for focusing the incident collimated light, while the spheres or cylinders on the emission side works as a collimating lens for putting the light back into collimated light. A single layer array of spheres or cylinders may be replaced with a sphere or cylinder type, or a graded-refractive-index type microlens array equivalent to them. The shape and the refractive index distribution of unit scatterer that yield the utmost efficiency for the above-described diffraction grating should be obtained by rigorous calculations of Maxwell's equations. It will result in aspherical or non-cylindrical lenses, or equivalent graded-refractive-index type lenses. The sphere or cylinder array should be considered rather as an example that is easily fabricated, while the performance is compromised somewhat. A microlens array itself is a typical MEMS, and much research has been conducted on the method for realizing the microlens array making full use of lithography and etching techniques. It is expected that the integration of microlens array and its driving mechanism makes it possible to produce the diffraction gratings according to the invention with an optimum shape and in high volume.

In FIG. 9, the direction of the driving is illustrated only for the x-axis direction, but the direction of the driving is not limited to one direction. In the case of two-dimensional arrays of such as spheres and lenses, diffracted light in another direction also can be enhanced by shifting in the y-axis direction. In addition, if the driving in the z-axis direction is possible, the greatest diffraction efficiency always can be attained by optimization of the distance between the two layers.

Figure 11:
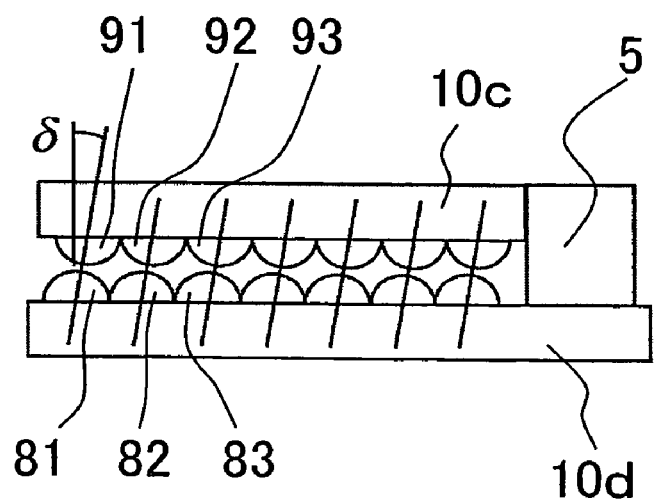
FIG. 11 is a cross-sectional view illustrating one example of the diffraction grating according to the present invention, which uses two opposing microlens arrays and a driving device.

FIG. 11 illustrates an example in which the configuration of FIG. 9 is realized by microlens arrays. In this embodiment, microlens arrays 10c and 10d, in which microlenses 81, 82, 82; 91, 92, 93 are arrayed respectively, are used as the light scatterers.

Figure 12A:
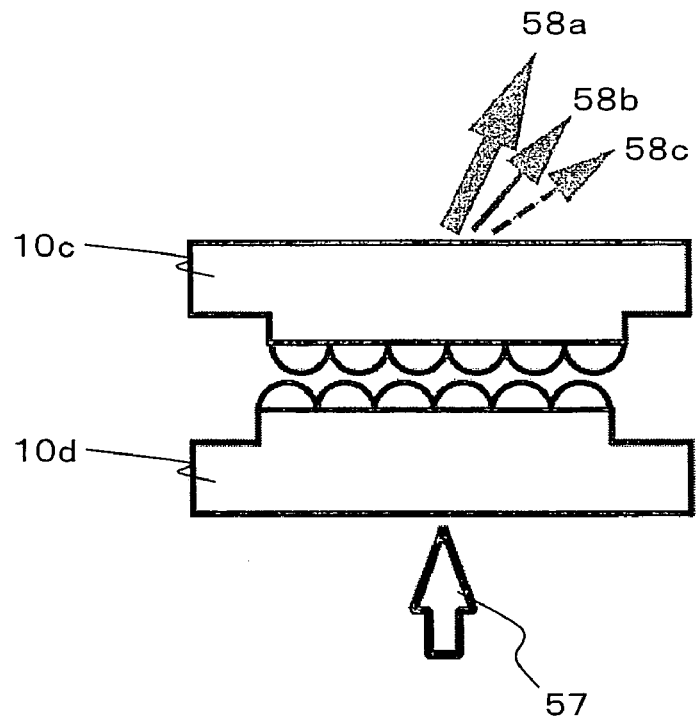
FIGS. 12A and 12B are cross-sectional views illustrating one example of a variable blaze wavelength diffraction grating using the diffraction grating of the present invention, and an operation thereof.
Figure 12B:
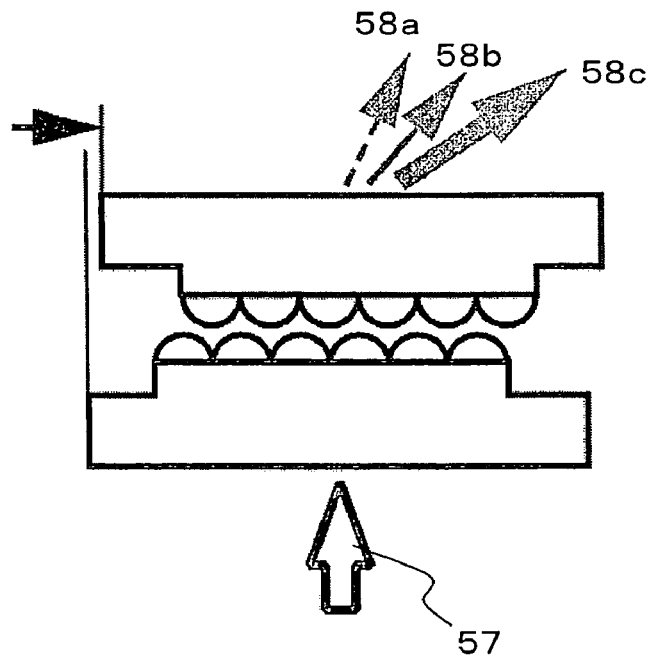

FIGS. 12A and 12B illustrate a variable blaze wavelength diffraction grating employing the diffraction grating shown in FIG. 11. Among diffracted lights 58a, 58b, and 58c diffracted from white light 57, a diffracted light with a desired wavelength (the diffracted light 58a in FIG. 12A; the diffracted light 58c with a longer wavelength than the diffracted light 58a in FIG. 12B) can be enhanced selectively by adjusting the relative positions of the microlens arrays 10c and 10d.

Figure 13A:
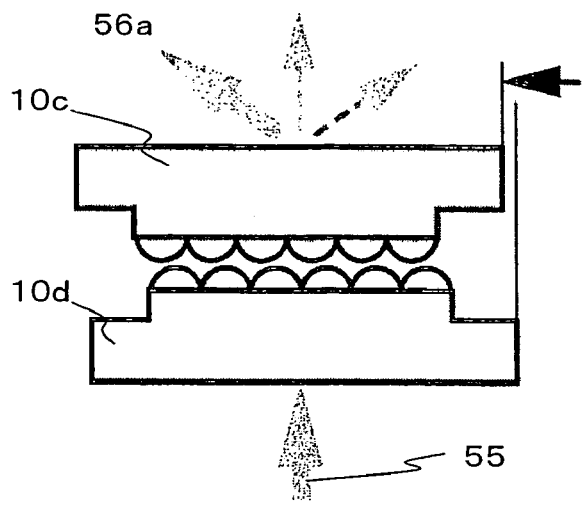
FIGS. 13A, 13B, and 13C are cross-sectional views illustrating one example of the optical switch using the diffraction grating of the present invention, and an operation thereof.
Figure 13B:
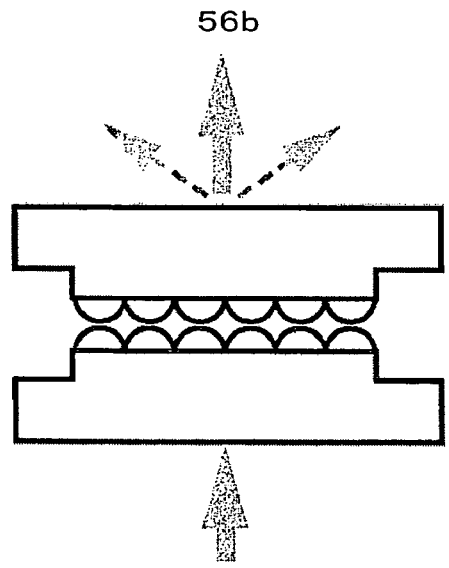
Figure 13C:
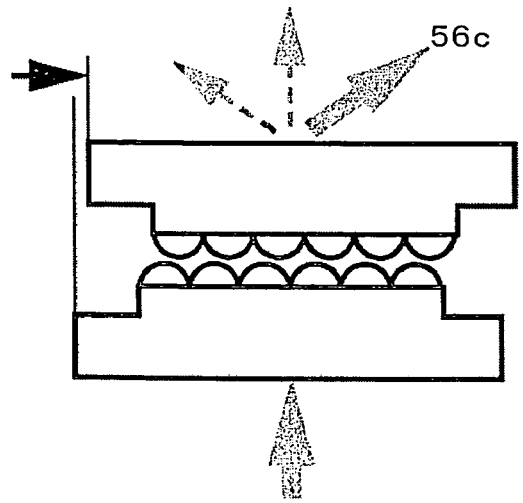

FIGS. 13A, 13B, and 13C illustrate an example of an optical switch that operates by switching of the orders of the enhancement. Among diffracted lights 56a, 56b, and 56c with −1, 0, and 1 orders, which originate from monochromatic light 55, a diffracted light with a desired order (a minus one order light 56a in FIG. 13A, a zero order light 56b in FIG. 13B, and a plus one order light 56c in FIG. 13C) can be enhanced selectively by adjusting the relative positions of the microlens arrays 10c and 10d. For the diffracted light with a predetermined order, this diffraction grating functions as an optical switch.

Figure 14:
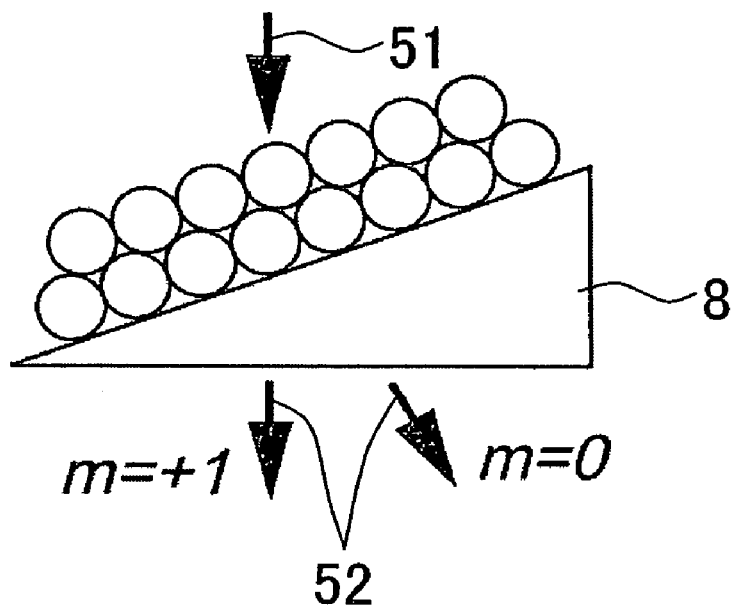
FIG. 14 is a view illustrating an example in which the diffraction grating according to the present invention is applied to a grism.

Considering the applications of diffraction gratings to date, it is expected that the diffraction grating according to the invention will find more ways of application. FIG. 14 illustrates a so-called grism as one of the examples. A grism is a hybrid element of a diffraction grating (grating) and a prism 8, in which required diffracted light 52 is adjusted to be coaxial with the incident light 51 due to the polarization effect of the prism 8. The use of grism makes it possible to take out a predetermined wavelength by merely inserting it into an optical system so that, for example, the image can be observed as it is.

Figure 15:
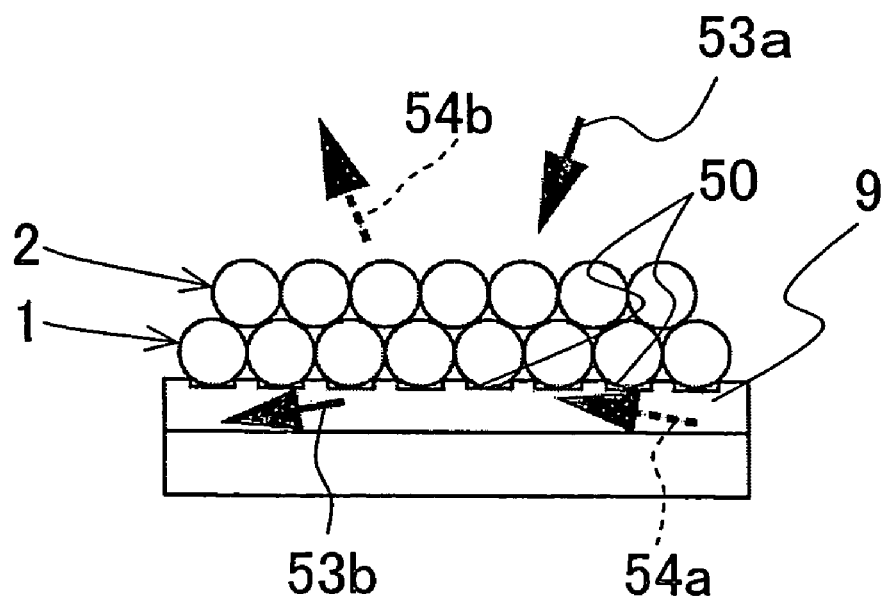
FIG. 15 is a cross-sectional view illustrating an example in which the diffraction grating according to the present invention is applied to a grating coupler for an optical waveguide.

FIG. 15 illustrates, as another example of application of the diffraction grating, a grating coupler of an optical waveguide 9. As shown in FIG. 15, if recesses 50 for positioning light scatterers are processed in a location where a coupler is to be formed, it is possible to incorporate a diffraction grating at a predetermined location in a self-assembled manner. Since the diffraction grating according to the invention is equivalent to the one that is blazed, light does not propagate in both directions but can be guided only in a specific direction from the coupler. In this device, incident lights 53a and 54a are led into the optical waveguide 9 (diffracted light 53b) or led out from the optical waveguide 9 (diffracted light 54b).

Figure 16:
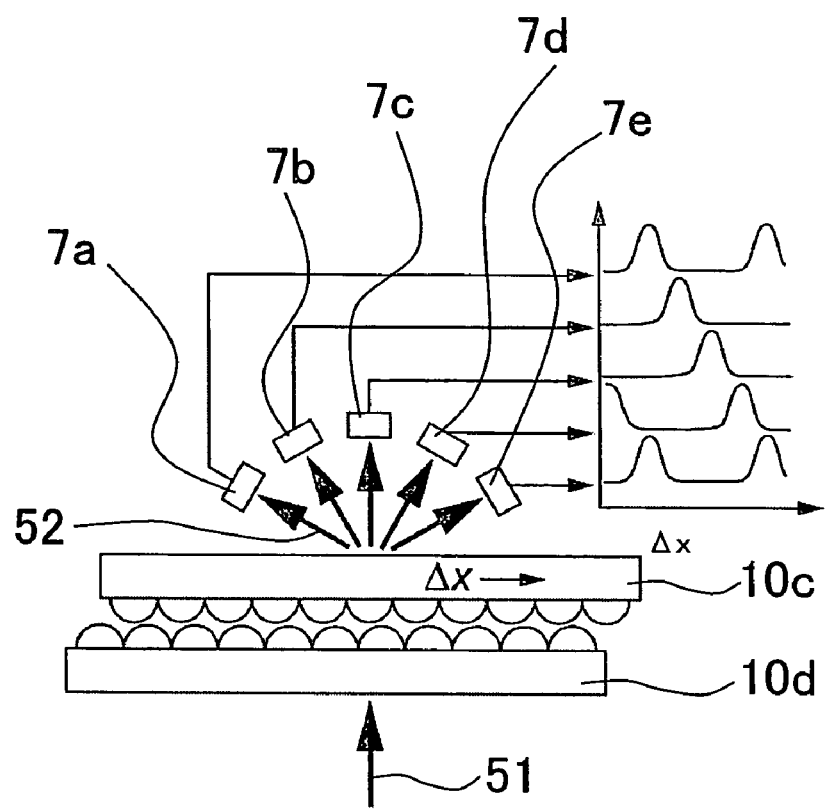
FIG. 16 is a cross-sectional view illustrating one embodiment of the position encoding device according to the present invention.
Figure 17:
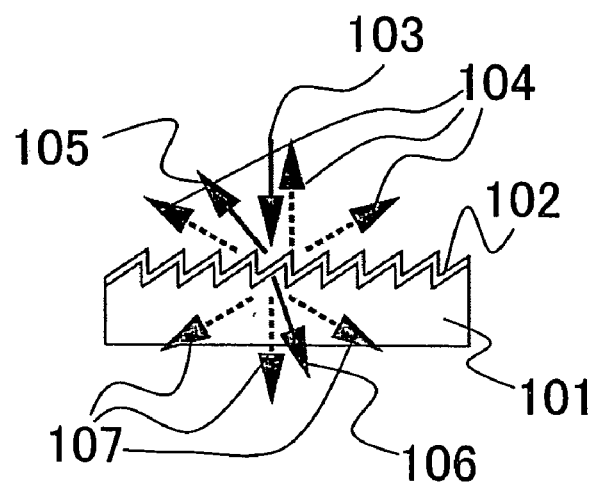
FIG. 17 is a cross-sectional view illustrating a conventional blazed diffraction grating.

FIG. 16 illustrates an example of a position encoding device. As has been explained referring to FIG. 9, the relative shifting of two layers in the diffraction grating by only a very small distance of several hundred nanometers changes which order of diffracted light is enhanced. This is utilized for position detecting. Two cylindrical microlens array-shaped scales 10c and 10d are opposed, and two members (not shown) that relatively move are attached thereto respectively. When collimated light 51 is incident thereon, diffracted lights 52 with a plurality of orders are produced. Light detection devices 7a to 7e are provided in the respective directions of the diffracted lights 52, for detecting the signal intensities for the respective orders (FIG. 16 illustrates an example in which the intensities of five diffracted lights up to±2 orders are detected). When the two members move relatively, the diffraction order that is enhanced changes one after another, and the detection device with a strong signal changes accordingly one after another. When the quantity of relative motion Δx becomes equal to the pitch p of the diffraction grating, the device goes back to the initial state. Thus, a change in position can be measured with a resolution of about several hundred nanometers. If the signal is interpolated as with a conventional encoder, it is possible to measure the position with a still finer resolution.

While particular embodiments of the invention have been described above, the invention may be practiced in various other forms without departing from the spirit thereof. For example, although the light diffraction phenomenon has been discussed as a main theme herein, the same principle holds for electromagnetic waves in general, such as microwaves and millimeter waves because the phenomena that can be expressed by Maxwell's equations are dealt with here. Moreover, although all the examples described hereinabove employed transmission diffraction gratings, there is no particular reason that the transmission type must be used, and the present invention also includes a diffraction grating that is combined with a mirror to form a reflective type diffraction grating a mirror, for example, and a device using such a diffraction grating. Furthermore, as conventionally performed with conventional optical elements, providing an anti-reflection coating or the like on a surface of the diffraction grating of the present invention is merely one embodiment of the present invention. The substrates illustrated in the embodiments are described for simplicity with an assumption that they have flat surfaces, but the same effect will be obtained even in cases where monolayer close-packed crystals are formed on two curved substrates.

INDUSTRIAL APPLICABILITY

As detailed in the foregoing, the present invention realizes a high efficiency blazed diffraction grating even in the wavelength range commonly known as the resonance domain, based on a principle totally different from conventional principles. Conventional diffraction gratings have necessitated highly sophisticated precision processing technology and been costly; however, the diffraction gratings according to the present invention can be fabricated at low cost because they can be realized by self-assembly techniques of microspheres or fibers. Moreover, in contrast to conventional diffraction gratings, which have a fixed blazing condition that has been set when designing them, the present invention makes it possible to tune the blazing condition by a control signal from the outside so that optimum performance can be attained in various use conditions. Furthermore, by utilizing the present invention, low-cost or tunable optical spectroscopes, optical integrated circuits, and position detector devices can be realized.

The invention claimed is:

1. A light diffraction method using a diffraction grating, wherein:

the diffraction grating comprises:

a first layer containing two or more first light scatterers, two or more of which being periodically arrayed along a first direction and either a) two or more of which being arrayed along a second direction or b) extending along the second direction; and a second layer containing two or more second light scatterers respectively corresponding to the two or more first light scatterers, the two or more second light scatterers being disposed at positions shifted from the two or more first light scatterers by a predetermined distance along a predetermined direction in a plane that is other than a plane containing the first direction and the second direction;

the method comprising:

making light incident on the diffraction grating so that:

in a case of a), the light is incident along a plane containing two or more trajectories selected from trajectories formed by the shifting of the two or more first light scatterers in the predetermined direction; and in both cases of a) and b), specular resonance occurs in two or more light scattering units, each comprising one light scatterer selected from the two or more first light scatterers and one of the second light scatterers corresponding to the selected one of the first light scatterers, whereby a fraction of diffracted light that is diffracted by the first layer and the second layer is enhanced selectively by the specular resonance in the two or more light scattering units.

2. The light diffraction method according to claim 1, further comprising the step of changing at least one selected from a relative positional relationship between the first layer and the second layer, and an incident angle of light on the diffraction grating, to change diffracted light that is to be enhanced selectively.

3. The light diffraction method according to claim 1, wherein diffracted light with a single order is enhanced selectively.

4. The light diffraction method according to claim 1, wherein diffracted light in a predetermined wavelength range is enhanced selectively.

5. A light diffraction device comprising:

a diffraction grating and a light projecting device, the diffraction grating comprising:

a first layer containing two or more first light scatterers, two or more of which being periodically arrayed along a first direction and either a) two or more of which being arrayed along a second direction or b) extending along the second direction; and a second layer containing two or more second light scatterers respectively corresponding to the two or more first light scatterers, the two or more second light scatterers being disposed at positions shifted from the two or more first light scatterers by a predetermined distance along a predetermined direction in a plane that is other than a plane containing the first direction and the second direction;

the light projecting device being for making light incident on the diffraction grating so that:

in a case of a), the light is incident along a plane containing two or more trajectories selected from trajectories formed by the shifting of the two or more first light scatterers in the predetermined direction; and in both cases of a) and b), specular resonance occurs in two or more light scattering units, each comprising one light scatterer selected from the two or more first light scatterers and one of the second light scatterers corresponding to the selected one of the first light scatterers, whereby a fraction of diffracted light that is diffracted by the first layer and the second layer is selectively enhanced by the specular resonance in the two or more light scattering units.

6. The light diffraction device according to claim 5, further comprising a driving device for changing at least one selected from a relative positional relationship between the first layer and the second layer, and an incident angle of light on the diffraction grating.

7. The light diffraction device according to claim 5, further comprising at least one light detection device for detecting diffracted light that has been enhanced selectively.

8. A position encoding device, comprising a light diffraction device according to claim 7, a first member, and a second member, wherein:

the first member and the second member are connected to the first layer and the second layer, respectively, and the at least one light detection device detects the intensity of diffracted light that changes according to relative positions of the first layer and the second layer, to detect the relative positional relationship between the first member and the second member.

9. A diffraction grating comprising:

a first layer containing two or more first light scatterers, two or more of which being periodically arrayed along a first direction and either two or more of which being arrayed along a second direction or extend along the second direction; and a second layer containing two or more second light scatterers respectively corresponding to the two or more first light scatterers, the two or more second light scatterers being disposed at positions shifted from the two or more first light scatterers by a predetermined distance along a predetermined direction in a plane that is other than a plane containing the first direction and the second direction;

wherein the diffraction grating has two or more light scattering units, in each of which one light scatterer selected from the two or more first light scatterers and one of the second light scatters corresponding to the selected one of the first light scatters are disposed adjacent to each other so that incident light can cause specular resonance; and the two or more first light scatterers and the two or more second light scatterers respectively in the first layer and the second layer are disposed spaced apart from each other.

10. The diffraction grating according to claim 9, further comprising a first substrate for retaining the two or more first light scatterers, a second substrate for retaining the two or more second light scatterers, and a gap-retaining member for retaining the first substrate and the second substrate so as to be spaced apart from each other.

11. The diffraction grating according to claim 9, further comprising a driving device for changing the relative positional relationship between the first layer and the second layer.

12. A diffraction grating comprising:
a first layer containing two or more first light scatterers, two or more of which being periodically arrayed along a first direction and either two or more of which being arrayed along a second direction or extend along the second direction; and
a second layer containing two or more second light scatterers respectively corresponding to the two or more first light scatterers, the two or more second light scatterers being disposed at positions shifted from the two or more first light scatterers by a predetermined distance along a predetermined direction in a plane that is other than a plane containing the first direction and the second direction;

wherein the diffraction grating has two or more light scattering units, in each of which one light scatterer selected from the two or more first light scatterers and one of the second light scatters corresponding to the selected one of the first light scatters are disposed adjacent to each other so that incident light can cause specular resonance;

the two or more first light scatterers and the two or more second light scatterers are disposed so as to be in contact with each other; and at least one selected from the two or more first light scatterers and the two or more second light scatterers has a shape other than a sphere, or both the two or more first light scatterers and the two or more second light scatterers are spheres but are disposed so as to form a structure other than a close-packed structure.

13. The diffraction grating according to claim 12, wherein the two or more first light scatterers and the two or more second light scatterers are columnar structures extending along the second direction.

14. Light diffraction device comprising a diffraction grating according to claim 9, and an optical component integrated with the diffraction grating.

15. A light diffraction device comprising a diffraction grating according to claim 12, and an optical component integrated with the diffraction grating.

* * * * *